United States Patent
Walker

(10) Patent No.: US 7,398,622 B2
(45) Date of Patent: Jul. 15, 2008

(54) CONNECTOR SYSTEMS FOR BUILDING MATERIALS

(76) Inventor: Richard A Walker, 19 Merinda Street, Greenslopes, Queensland (AU)

( * ) Notice: Subject to any disclaimer, the term of this patent is extended or adjusted under 35 U.S.C. 154(b) by 433 days.

(21) Appl. No.: 10/528,399

(22) PCT Filed: Oct. 9, 2003

(86) PCT No.: PCT/AU03/01332

§ 371 (c)(1),
(2), (4) Date: Mar. 17, 2005

(87) PCT Pub. No.: WO2004/033925

PCT Pub. Date: Apr. 22, 2004

(65) Prior Publication Data

US 2006/0165484 A1  Jul. 27, 2006

(30) Foreign Application Priority Data

Oct. 9, 2002 (AU) .................. 2002951928
Dec. 2, 2002 (AU) .................. 2002953020

(51) Int. Cl.
E06B 3/964 (2006.01)

(52) U.S. Cl. ............ 52/204.69; 52/233; 52/592.4; 52/590.2

(58) Field of Classification Search .......... 52/207, 52/204.69, 2.26, 222, 223.13, 598, 233, 592.1–592.6, 52/590.1, 590.2; 403/403; 49/501; 411/18, 411/24, 32, 33, 35, 57.1, 60.1; 446/111, 446/112, 122, 123

See application file for complete search history.

(56) References Cited

U.S. PATENT DOCUMENTS

| 792,979 | A | * | 6/1905 | Fulghum | 403/331 |
|---|---|---|---|---|---|
| 2,879,840 | A | * | 3/1959 | Etten | 160/91 |
| 4,674,930 | A | * | 6/1987 | Poe et al. | 411/40 |
| 4,949,509 | A | * | 8/1990 | Gold | 49/502 |
| 5,560,149 | A | * | 10/1996 | Lafevre | 49/501 |
| 5,996,302 | A | * | 12/1999 | Choisel | 52/586.1 |
| 6,041,552 | A | * | 3/2000 | Lindahl | 49/458 |
| 6,094,874 | A | * | 8/2000 | Manzella | 52/204.62 |
| 6,330,769 | B1 | * | 12/2001 | Manzella et al. | 52/204.62 |
| 6,536,166 | B1 | * | 3/2003 | Alley | 52/25 |
| 6,823,638 | B2 | * | 11/2004 | Stanchfield | 52/588.1 |

FOREIGN PATENT DOCUMENTS

| AU | 540685 B | 11/1981 |
|---|---|---|
| DE | 2343047 A | 2/1975 |
| GB | 2291687 A | 1/1996 |

* cited by examiner

Primary Examiner—Richard E. Chilcot, Jr.
Assistant Examiner—Mark R Wendell
(74) Attorney, Agent, or Firm—David A. Guerra

(57) ABSTRACT

A connector (15) for connecting modules together comprises plastic connector member (16), an expander rod (17) and a threaded expander rod displacer (18). The connector member (16) has spaced dovetail style enlargements (19) on one side and a full length dovetail enlargement (20) on the other side. The connector member (16) is designed to slide in the confronting slots with the wasted sections (21) of the expander (17) located inside each of the sections (19). Once in position the threaded expander rod displacer (18) is used to axially displace the expander (17) to force the enlarged sections of the expander (17) into the sections (19) thus engaging the slot and at the same time biasing the modules together.

15 Claims, 13 Drawing Sheets

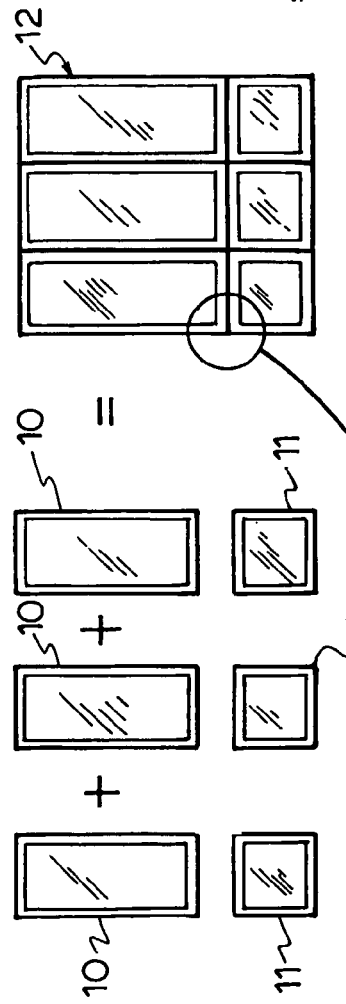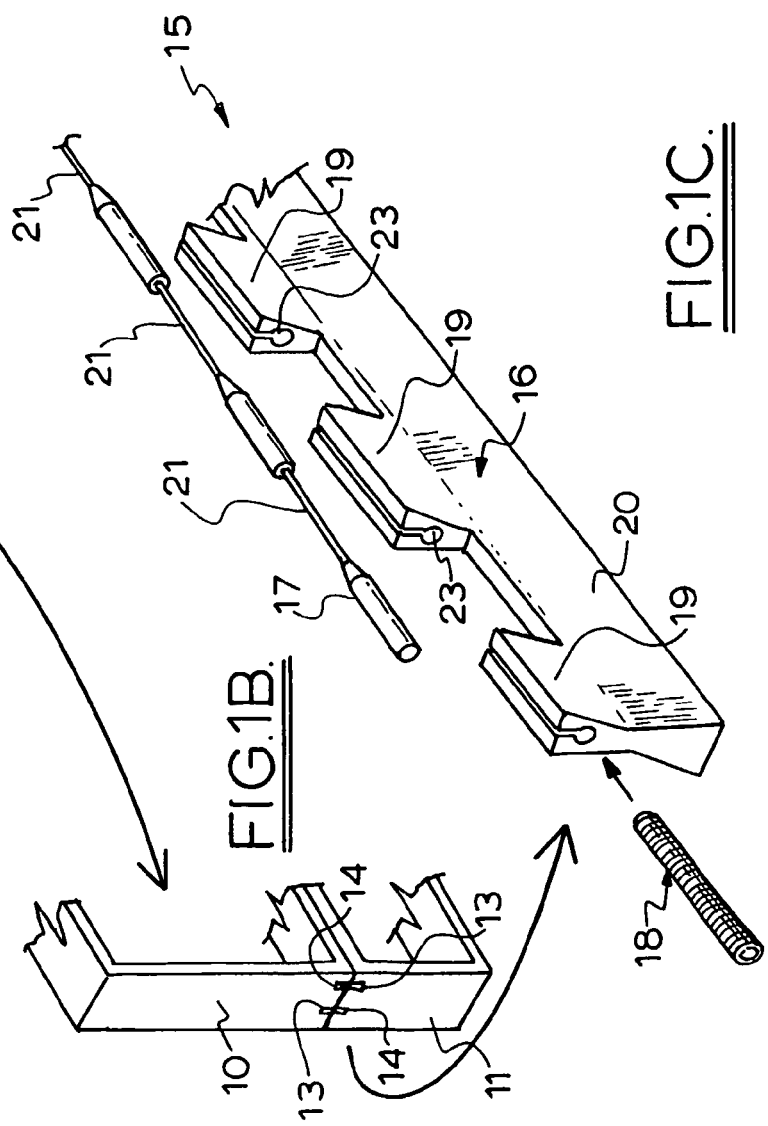

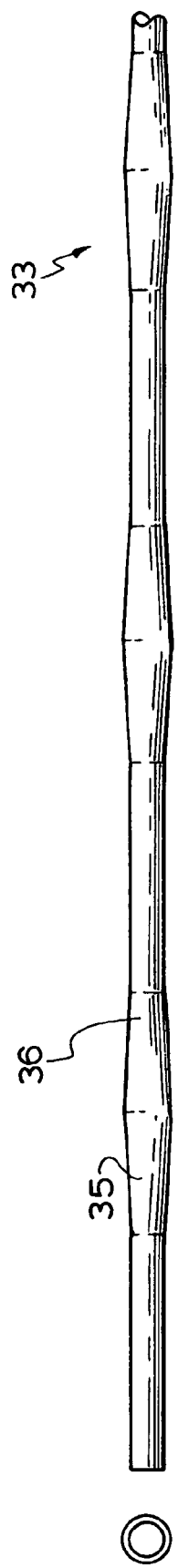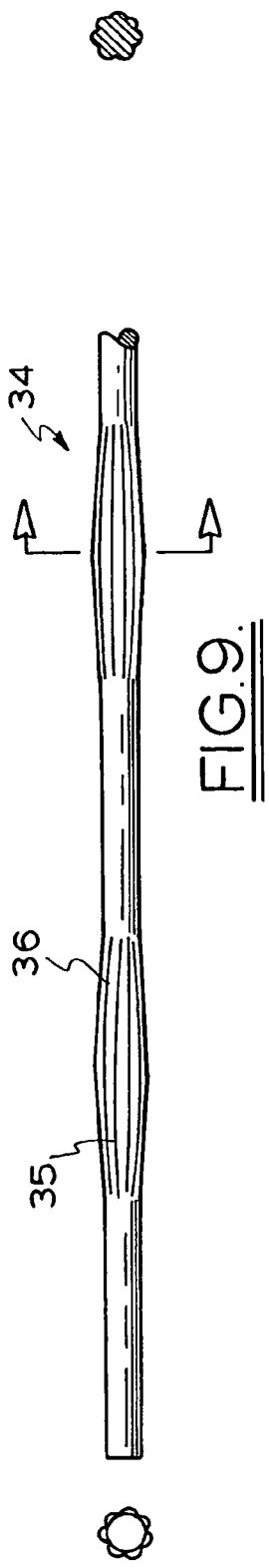

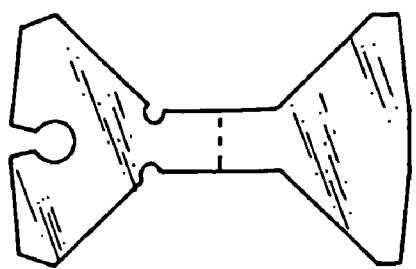
FIG. 23.
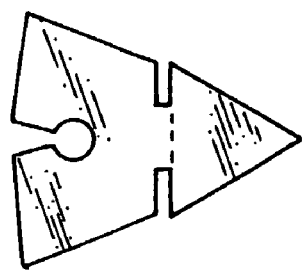
FIG. 25.
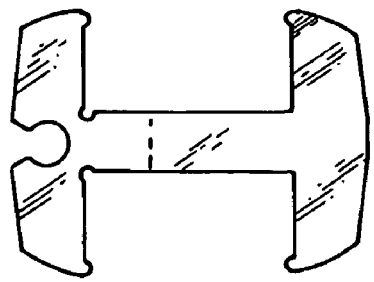
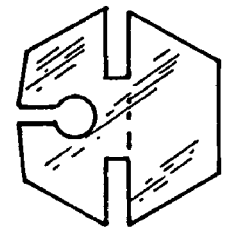
FIG. 24.
FIG. 22.

CONNECTOR SYSTEMS FOR BUILDING MATERIALS

CROSS-REFERENCE TO RELATED APPLICATIONS

This application is an U.S. national phase application under 35 U.S.C. 371 based upon co-pending International Application No. PCT/AU2003/001332 filed on Oct. 9, 2003. Additionally, this U.S. national phase application claims the benefit of priority of co-pending International Application No. PCT/AU2003/001332 filed on Oct. 9, 2003, Australian Application No. 2002951928 filed on Oct. 9, 2002, and Australian Application No. 2002953020 filed on Dec. 2, 2002. The entire disclosures of the prior applications are incorporated herein by reference. The international application was published on Apr. 22, 2004 under Publication No. WO 2004/033925 A1.

TECHNICAL FIELD OF THE INVENTION

THIS INVENTION relates to a connector and associated construction methods and systems and in particular but not limited to construction techniques and methods concerning exterior modular building materials, typically windows.

BACKGROUND TO THE INVENTION

Many arrangements are used to connect building panels in edge to edge relation. Typical arrangements are tongue and groove arrangements. Some arrangements involve cooperating edge configurations where bridging fitting is used to secure the panels together.

Australian Patent No 540685 uses a panel where the edge is and I-shaped tongue which effectively has side slots and is fitted freely into a slot with a cross shape in profile on the other panel, the cross shaped slot effectively has opposed side slots align with side in the slots in the tongue resulting in longitudinal spaces on either side of the tongue and bridging the tongue and the slot. The panels are locked together by pins or rods located in the spaces thus blocking removal of the tongue.

DE2343047 connects panels using alternating hook like lobes separated by recesses. The lobes and recesses are the same width and are offset on each panel.

GB2291687 describes panel edges having lugs and recesses so the lugs fit into the recesses of the other panel, each lug has a through hole and they all line up so a rod through the lugs locks the panels together.

OUTLINE OF THE INVENTION

In one aspect there is provided a connector system for connecting two members together, the connector system comprising a connector member and a connector member expander, the connector member in profile having enlarged ends and a narrower intermediate section between the ends, one end having a slot to receive the connector member expander to expand the slot so the enlarged end is biassed to retentively engage a body located adjacent the intermediate section.

Preferably, the connector member is generally I-shaped in profile having a central web connecting opposed pairs of bilaterally projecting arms, at least one set of arms having the expandible slot so that upon axial movement of the expander in the slot, the set of arms are biassed toward the other set of arms.

The connector member is typically shaped or configured to match the body that is located adjacent the intermediate section. The connector member may have two or more ends, all the ends may have slots and corresponding expanders.

In one embodiment the connector member is a short plug and the expander is a grub screw. In another embodiment the connector member is a long strip and the connector member is a rod driven onto the slot.

Preferably, the connector member is an elongate strip, the enlarged ends extending along opposite edges of the strip, the enlarged ends on at least one edge being separated by gaps, the expander comprising a rod having spaced enlargements each functioning as connector expanders, the enlargements on the rod being separated by narrower regions that initially locate in the expandable slots and upon axial movement of the rod the enlargements move into the slots to expand the slots.

The T-shaped ends preferably include peripheral longitudinal beading that contacts the body. The connector member preferably has arms projecting from the narrow intermediate section, there being a juncture between the arms and the intermediate section, there being a small slot at the juncture of the arms being adapted to close or partially close as the arms are biassed. Each arm preferably has a bead extending along an edge of the arm, the bead providing a focal line for the bias.

The expander may be a pin, screw, rod or other means. The expander may comprise a single expander or multiple expanders. The expander may have expander section separated by narrow non-expander sections and be located wholly within the connector member until driven into expanding position by an expander displacer.

The connector members may be short or long.

The expander may be one way or reversible so that the connector member may release the body held when the expander is reversed. As a consequence application of the expander may vary. Where the expander is, for example, a grub screw it may be applied and reversed using a conventional tool. The expander may be driven by a hammer from one end and reversed by operation from its opposite end by driving a rod or screw into the opposite end of the slot.

Preferably, the expander has tapered enlargements, the tapered enlargement preferably being tapered at opposite ends, so that the expander is reversible. The enlargement may be fluted to reduce friction.

In a preferred application of the invention there is provided in combination a modular window system comprising window modules and a window module connector system, each window module having slotted outer frame members, the connector system comprising an elongate connector member and a connector member expander, the connector member being adapted to retentively engage the slots in the slotted members upon application of the expander to the connector member.

In another invention there is provided an improved window frame assembly having a sash, a sill and a seal disposed between the sash and sill, the seal having a section adjacent a lower edge of the window assembly, the sill and sash having complimentary lower marginal sections outboard of said seal and extending along at least the lower edge of the window assembly, the lower marginal sections defining there between an inclined water flow passage means, the water flow passage means being downwardly inclined from a position adjacent said seal to the edge of the window assembly. This window frame assembly may be utilized in the modular window system described herein.

BRIEF DESCRIPTION OF THE DRAWINGS

In order that the present inventions may be more readily understood and be put into practical effect reference will now be made to the accompanying drawings which illustrate preferred embodiments, and one application of the connector system as applied to a modular window system, it will be appreciated that the connector system has general application and wherein:

FIGS. 1A, 1B and 1C are schematic drawings illustrating a connector system as applied to modular windows and employing in profile a dove tail shaped connector member;

FIGS. 7 to 9 illustrate different expanders;

FIGS. 22 to 25 are drawings illustrating various connector member profiles; and

METHOD OF PERFORMANCE

Figure 2:
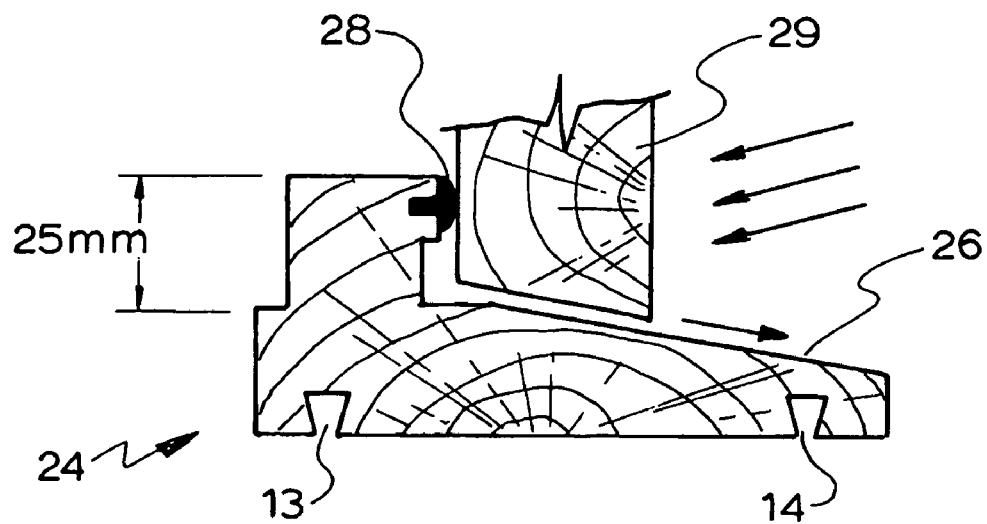
FIG. 2 and FIG. 3 are drawings of part sections through lower marginal sections of typical window assemblies.

The following description deals with application of the connector system to external windows where the ability of the connector system to draw the two parts being connected together is considered beneficial. It will be apparent however that the connector has general application and the following description is non-limiting.

Referring to the drawings and initially to FIGS. 1A to 1C there is illustrated a modular window system employing window modules 10 and 11 which may be connected together to form a modular assembly 12. Each module has spaced dovetail slots 13 and 14 which are positioned in confronting relation as shown in the inset of FIG. 1B and the modules are retained together by connectors 15 engaged in the slots. A typical connector is illustrated in exploded form at 15 in FIG. 1C.

The connector 15 comprises a plastics connector member 16, an expander rod 17 and a threaded expander rod displacer 18. The connector member 16 has spaced dovetail style enlargements 19 on one side and a full length dovetail enlargement 20 on the other side. The connector member is designed to slide in the confronting slots 13 and 14 with the wasted sections 21 of the expander 17 located inside each of the sections 19. Once in position the threaded expander rod displacer 18 is used to axially displace the expander 17 to force the enlarged sections 22 of the expander 17 into the sections 19. This has the effect of not only engaging the slot but at the same time of biassing the modules together.

It will be appreciated that the connector parts may be of any shape and configuration that is able to achieve the mechanically equivalent function described.

Figure 3:
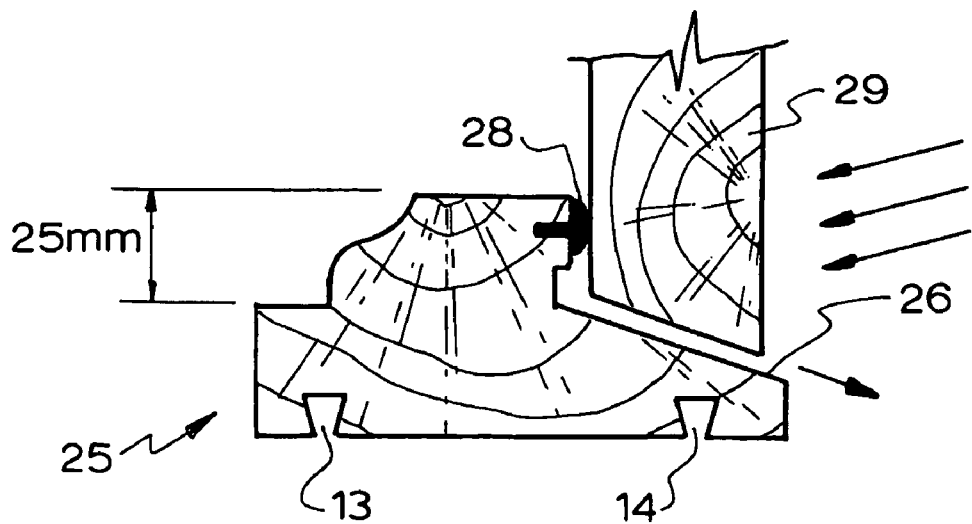

FIGS. 2 and 3 illustrate two different modules being a lower section of a double hung window at 24 and typical awning and casement window section at 25. Common to these is the sloping section 26 of the sill 27 outboard of a seal 28. In each case a sash 29 is complimentary with the sill 27.

Figure 4:
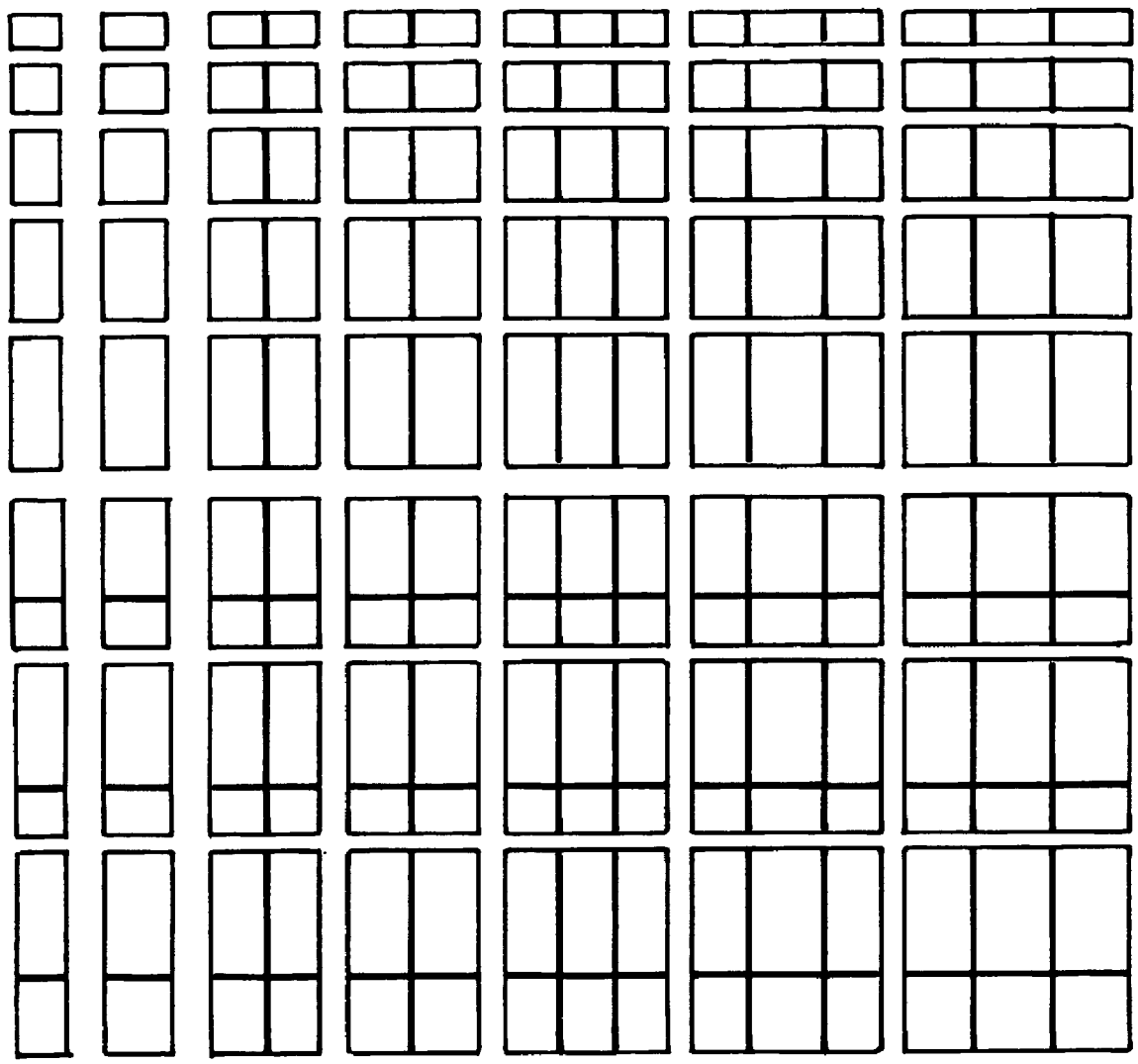
FIG. 4 is a schematic drawing illustrating the arrangement of modules typical in the applicant's modular window system.

FIG. 4 illustrates typical modules and modular assemblies that may be made using the teachings of the present invention.

Figures 5, 6:
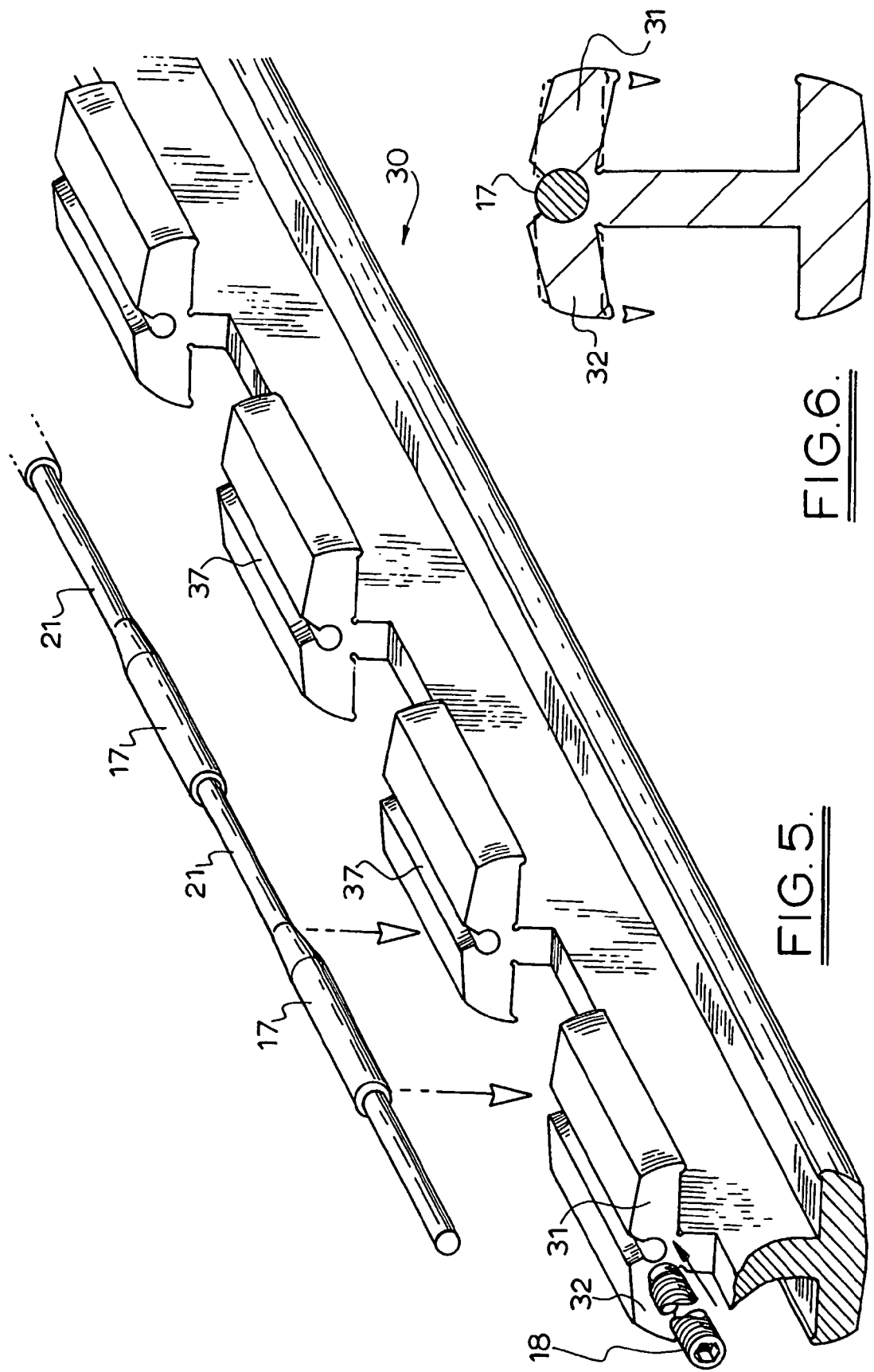
FIGS. 5 and 6 illustrate a further embodiment employing in profile an I-shaped connector member.

FIGS. 5 and 6 illustrate a further embodiment adapted to a different shaped slotted profile, the connector member 30 in this case is I-shaped and operates with an expander as described. The slotted members that are connected together have confronting T-shaped slots corresponding to half the profile of the connector member. FIG. 6 illustrates the way arms 31 and 32 are biassed inwardly (unexpanded position in phantom) under the influence of the expander.

FIGS. 7 to 9 show expanders 33, 17 and 34 respectively. The expanders 33 and 34 have a double taper at 35 and 36 to enable reversal should one want to disconnect. The expander 17 is less easy to reverse and the slots 37 in FIG. 4 may be molded with a small catch to engage shoulder 38 in order to prevent or inhibit reversal. The expander 34 has fluted and double tapered enlargements. This limits friction and is particularly suited to longer embodiments.

Figure 12:
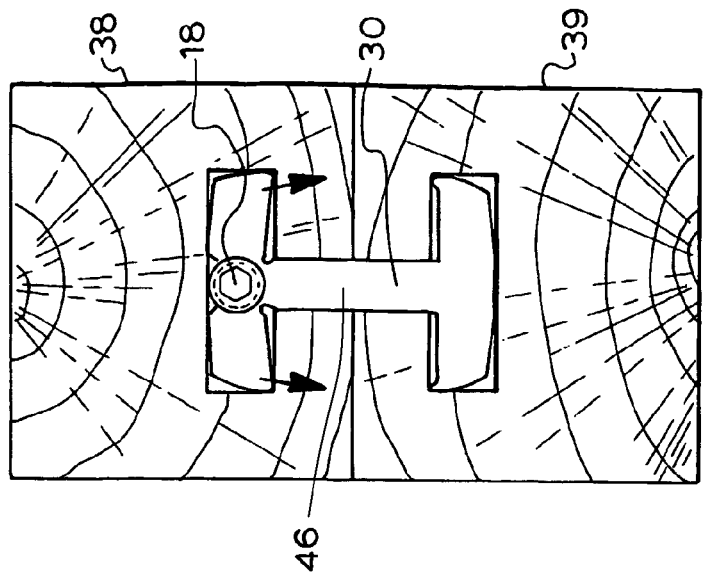
FIGS. 10 to 12 illustrate operation of the connector in a panel edge to edge operation.
Figure 11:
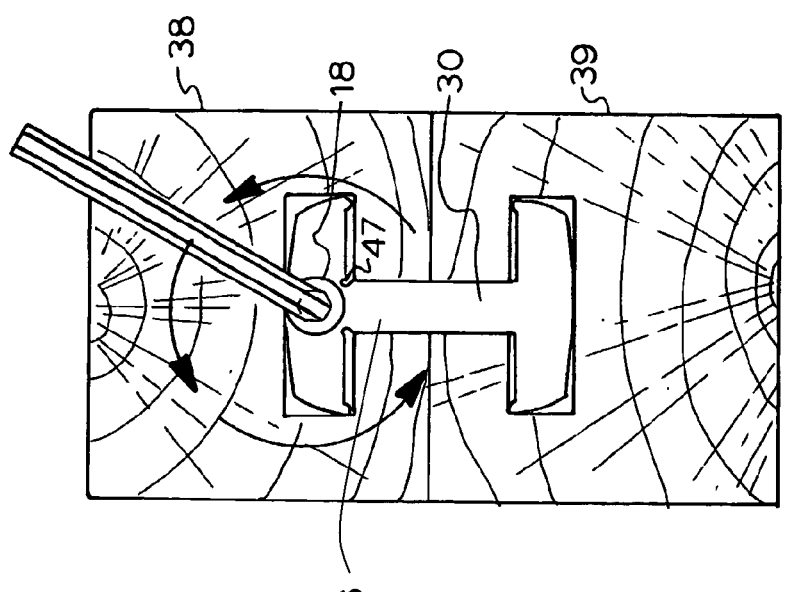
Figure 10:
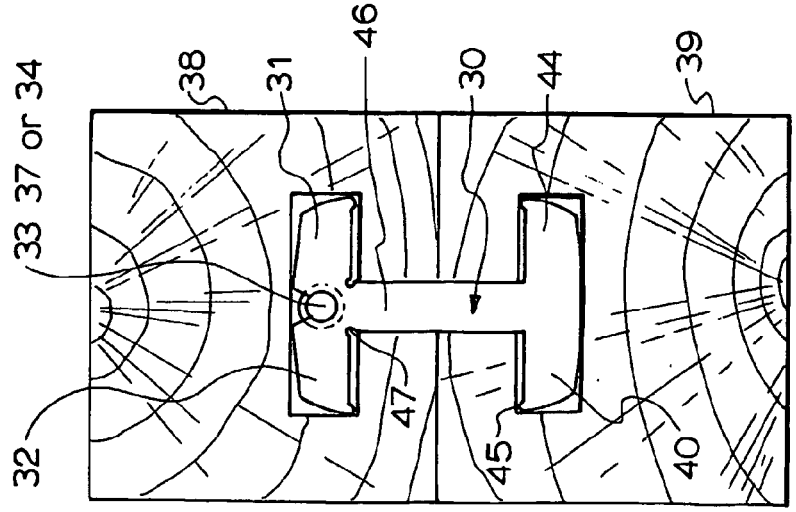

FIGS. 10 to 11 show the connector assembled in slotted panels 38 and 39, the panels 38 and 39 have T-shaped slots routed in the edges so that the resulting combination corresponds in profile to a marginally larger than the connector 30 but still a workable fit. The expander is in place in FIG. 10 in its release position. FIGS. 11 and 12 show the application of the threaded expander displacer 18. The connector member has arms 31,32,40 and 44. Each arm has a bead 45, arms 31 and 32 at the juncture of the arms 31 and 32 with the web 46 has small slots 47. The slots are in the corner, the effect of the small slots 47 is to limit the material resistance to the arms assuming the inward retentive action shown in FIG. 12 while the beads provide focal lines for the applied bias force.

Figure 13A:
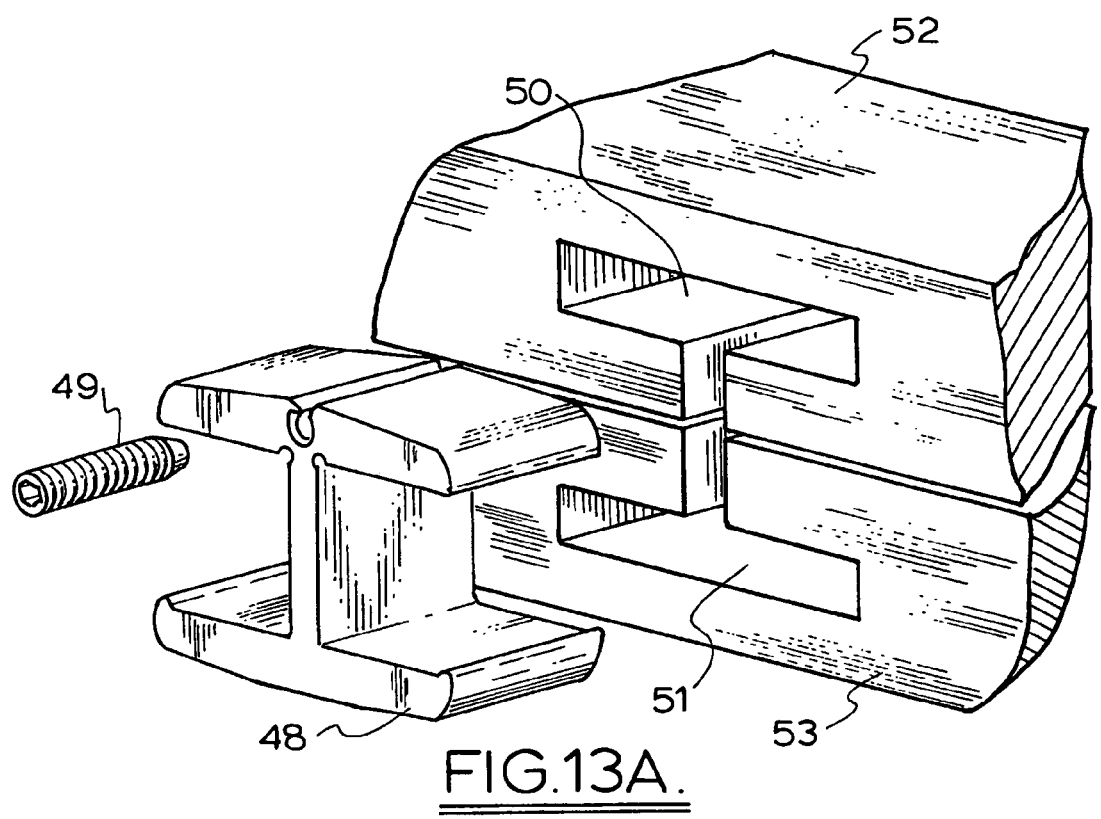
FIGS. 13A and 13B illustrate operation of a short connector in a side by side panel arrangement.
Figure 13B:
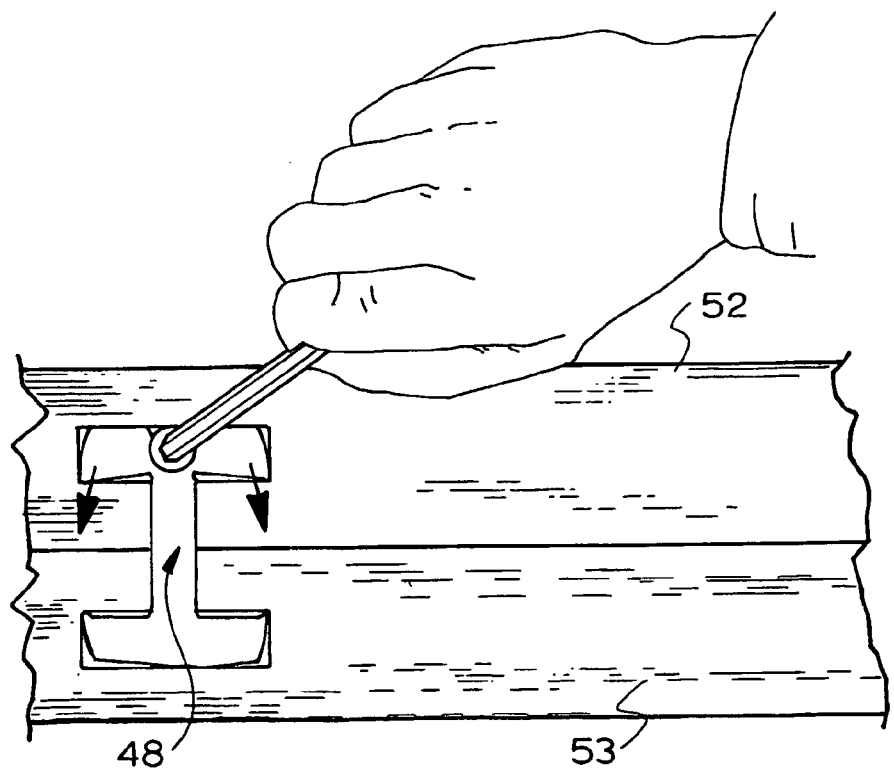

FIG. 13A illustrates a short connector member 48 having the same profile as connector 30 but does not utilize the long expander, rather it uses a grub screw as the expander. Correspondingly short slots 50 and 51 in panels 52 and 53 may be employed as illustrated in FIG. 13B.

Figure 14:
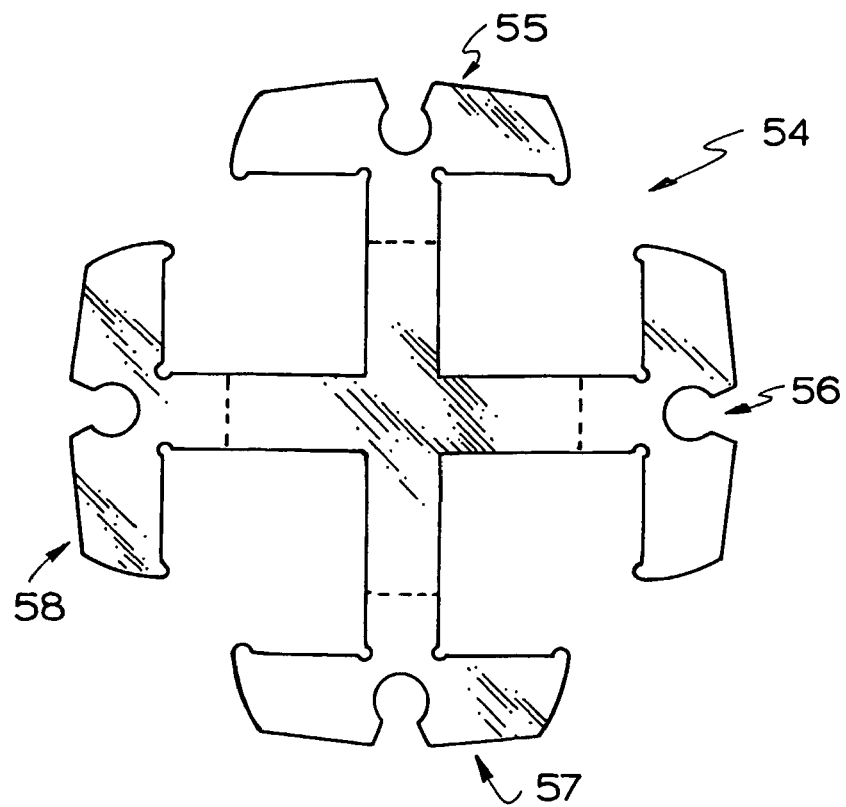
FIG. 14 is a profile of a four ended connector.
Figure 15:
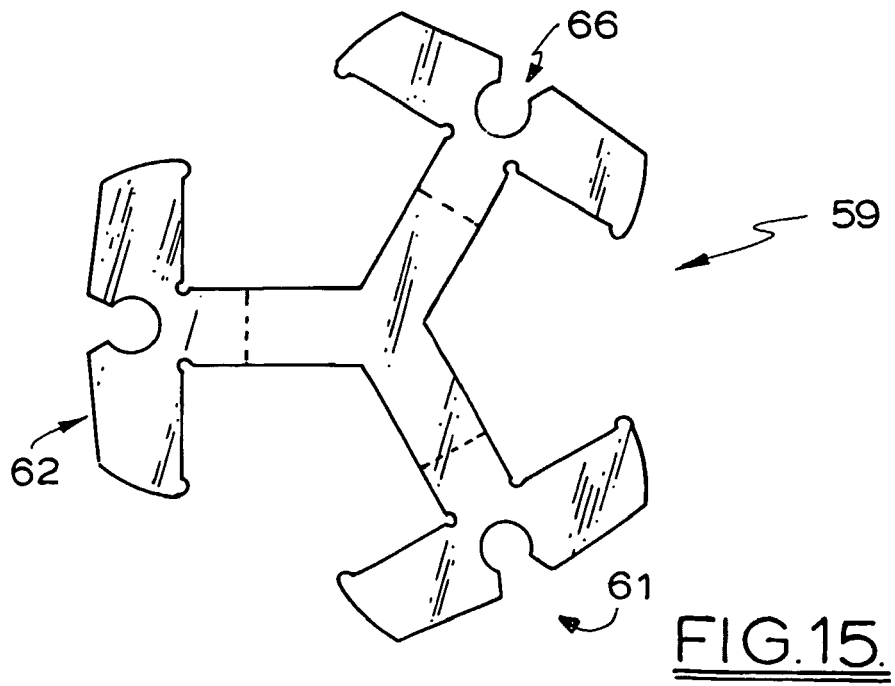
FIG. 15 is a profile of a three ended connector.

FIG. 14 is a profile of a four ended connector 54, it has T-shaped ends 55,56,57 and 58 which are each effectively the same configuration as the deformable ends of the connector 30. It will be clear that the edges of four panels may be connected in a cross shape with adjacent panels at 90 degrees. In FIG. 15 connector 59 has three ends 60,61 and 62 and but would have the panels at 120 degrees.

Figure 16:
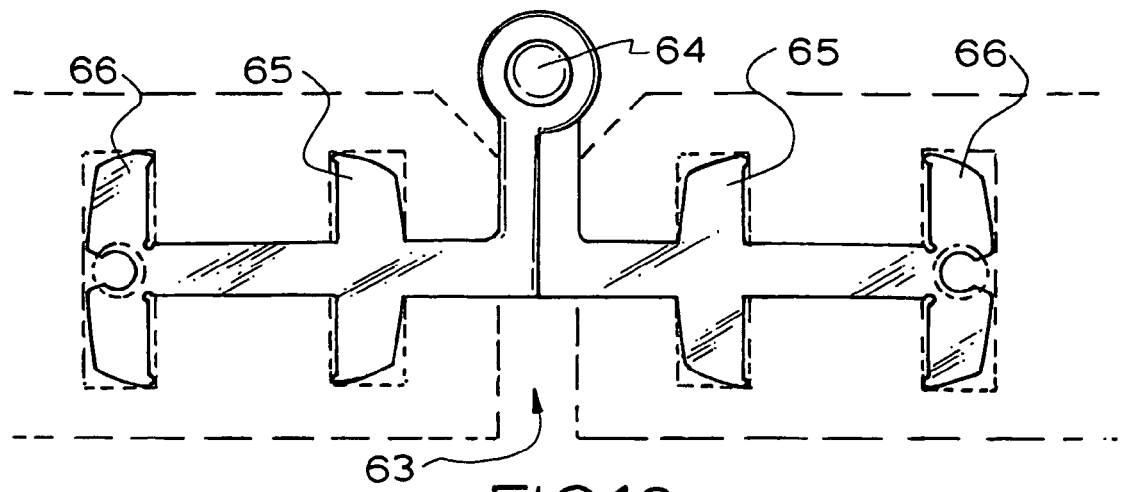
FIG. 16 is a profile of a hinge connector.
Figure 19:
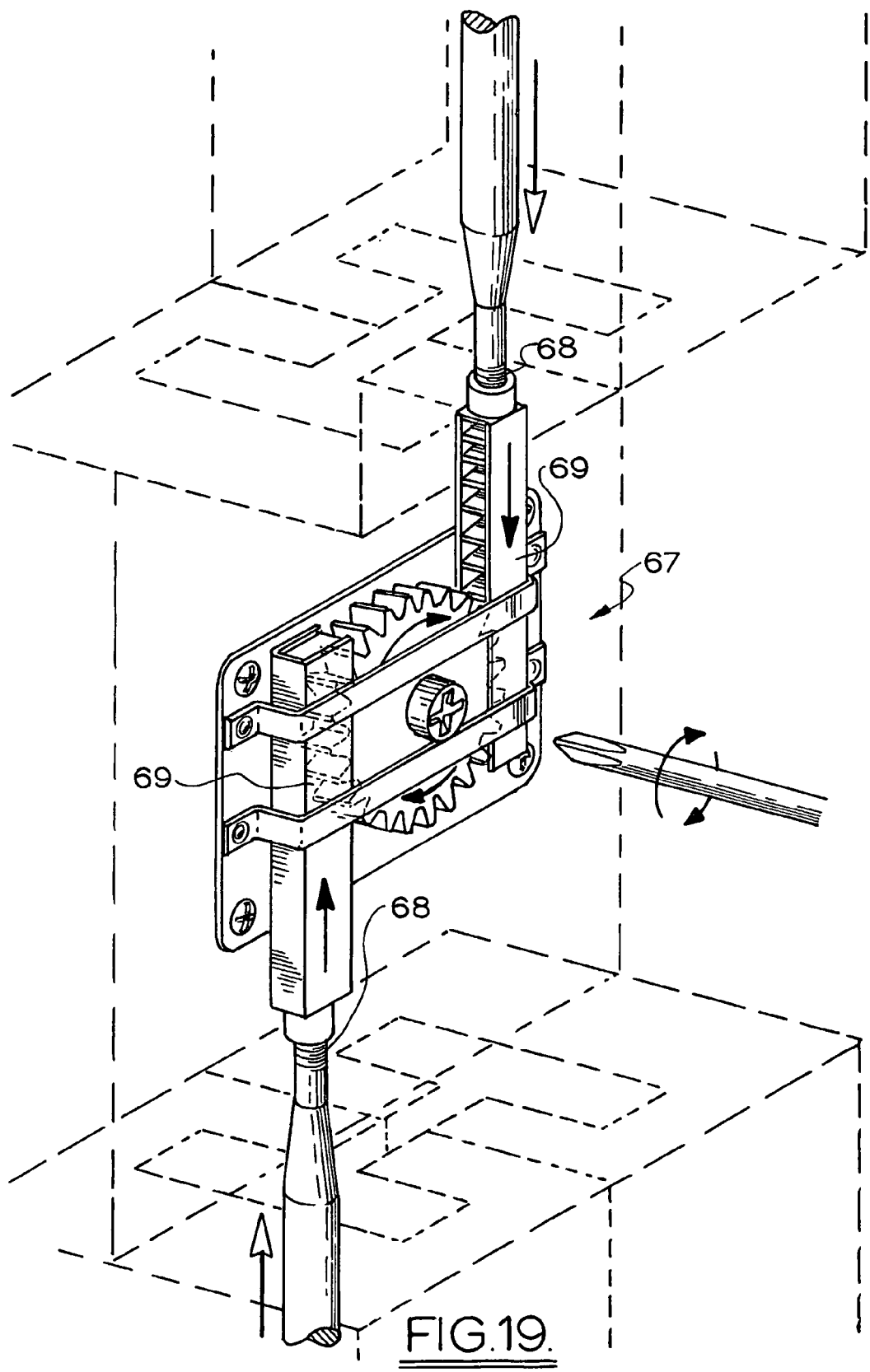
FIG. 19 is a drawing illustrating a gear assembly for applying the expander in situations where axial tool access is not available.

The versatility of the invention is dramatically illustrated by FIGS. 16 and 19. FIG. 16 is a hinge connector 63. In this case a hinge with a pin at 64 is formed in the usual way but is retained in the slots shown in phantom by the present invention. Two set of non-flexing arms 65 are added to improve the gripping action although only the flexing arms 66 are required. The size of the panels supported may dictate the number of arms required.

Figures 17, 18:
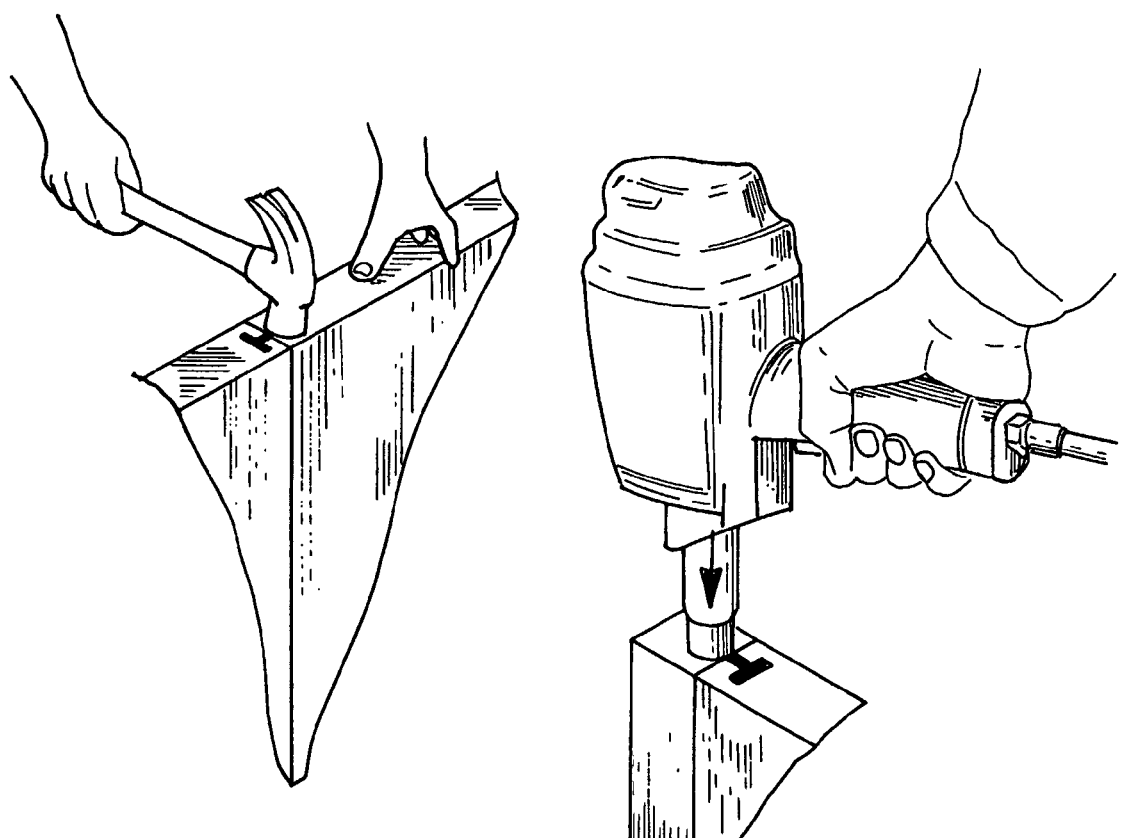
FIGS. 17 and 18 are drawings illustrating typical tools for applying the expander using a hammer action.

FIGS. 17 and 18 illustrate driving methods to apply the expander or expander displacer.

Figure 20:
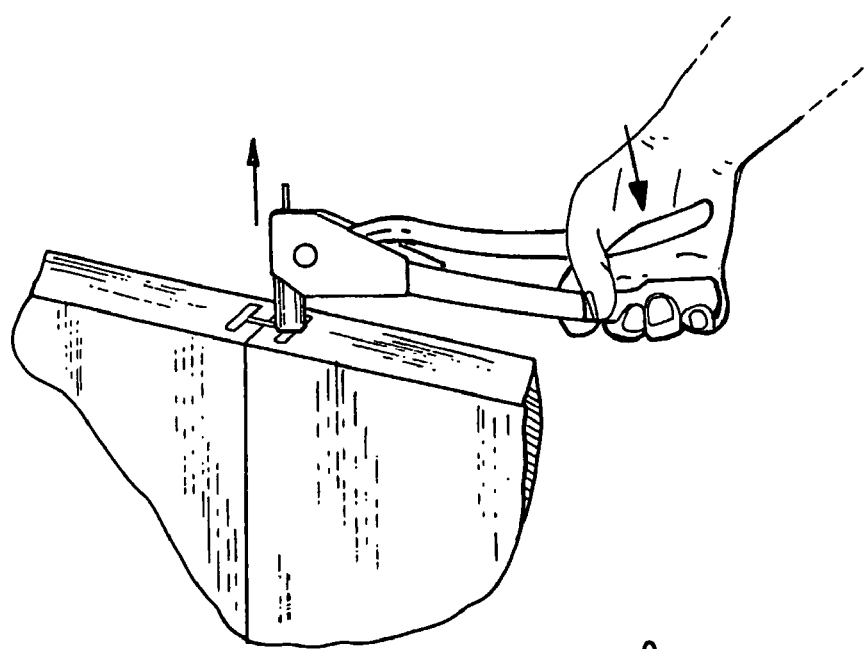
FIGS. 20 and 21 are drawings illustrating a setup for pulling an expander into position rather than pushing.
Figure 21:
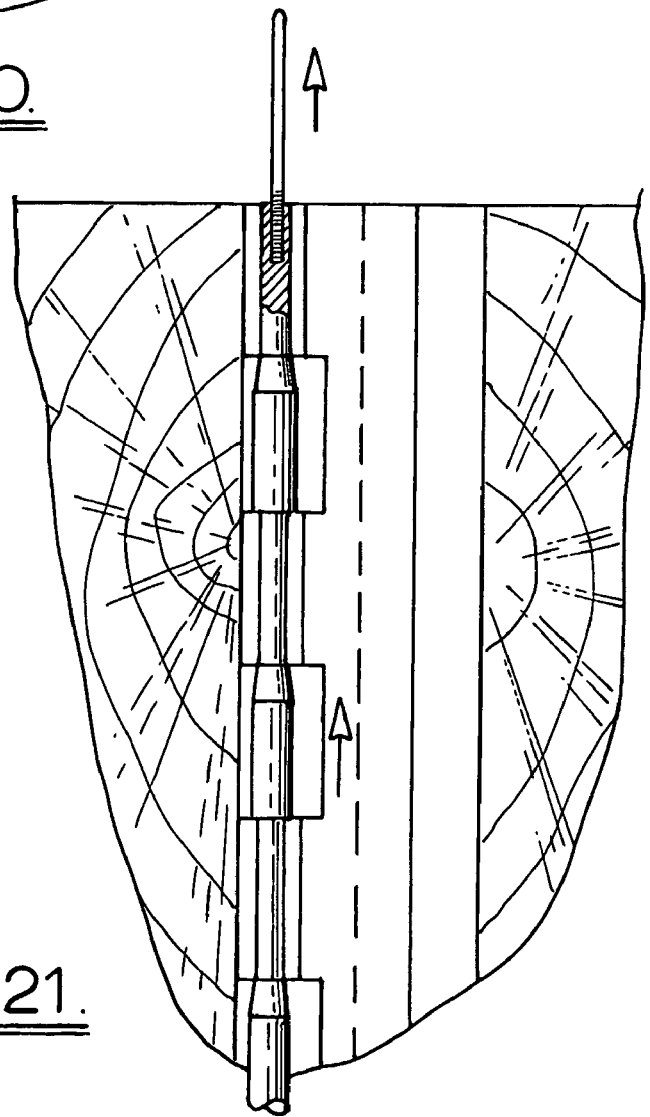
Figure 26:
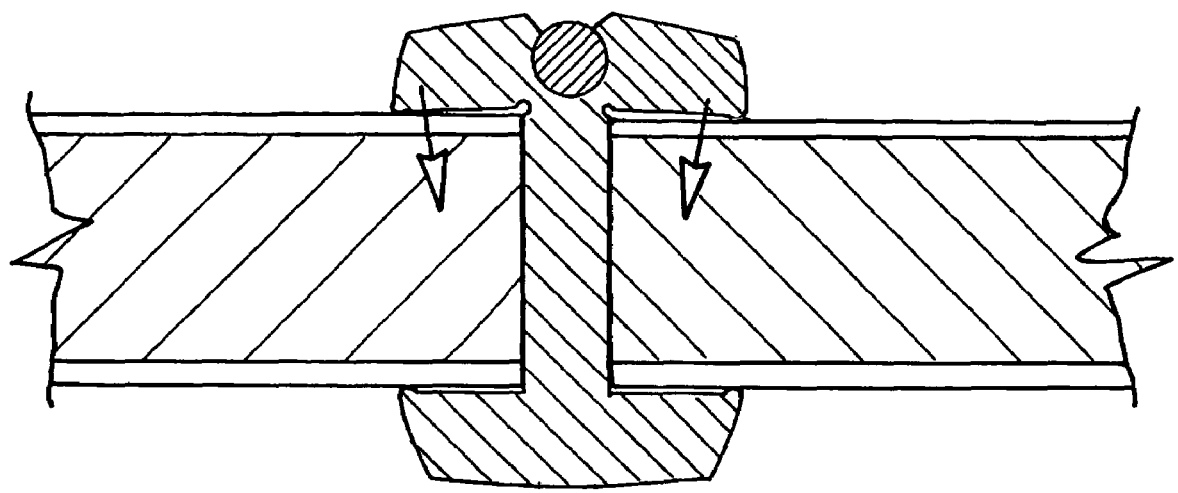
FIG. 26 is a section showing external application of the connector.

FIG. 19 illustrates a gear assembly 67 of the rack and pinion type which may be used in situation where axial access to drive the expander is not available as might be the case between floors. In this case the expanders have threaded ends 68 and are permanently coupled to the racks 69 so they may be pulled or pushed and the panels may be released later. FIGS. 20 and 21 illustrate a pulling action to apply the expander similar to a rivet tool. FIGS. 22-25 illustrate variations in profile for different applications. FIG. 26 illustrates external use of the invention.

Whilst the above has been given by way of illustrative example many variations and modifications will be apparent to those skilled in the art without departing from the broad ambit and scope of the invention as herein set forth in the appended claims.

The invention claimed is:

1. A connector system for connecting members together, the connector system comprising a connector member and a connector member expander, the connector member in profile having enlarged ends and a narrower intermediate section between the ends, one end having a slot to receive the connector member expander to expand the slot so the enlarged end is biassed to retentively engage a body located adjacent the intermediate section, wherein the connector member expander has an expander section serarated by narrow non-expander sections and in use be located wholly within the connector member until driven into expanding position by an expander displacer.

2. The connector system according to claim 1 wherein the connector member is generally I-shaped in profile having a central web connecting opposed pairs of bilaterally projecting arms, at least one set of arms having the expandible slot so that upon axial movement of the expander in the slot, the set of arms are biassed toward the other set of arms.

3. The connector system according to claim 1 wherein the connector member is shaped to match the body that is located adjacent the intermediate section.

4. The connector system according to claim 1 wherein the connector member is a-short plug and the expander is a grub screw.

5. The connector system according to claim 1 wherein the connector member is an elongated strip and the connector member expander is a rod driven onto the slot.

6. The connector system according to claim 1 wherein the connector member is an elongate strip, the enlarged ends extending along opposite edges of the strip, the enlarged ends on at least one edge being separated by gaps, the expander comprising a rod having spaced enlargements each functioning as connector expanders, the enlargements on the rod being separated by narrower regions that initially locate in the expandable slots and upon axial movement of the rod the enlargements move into the slots to expand the slots.

7. The connector system according to claim 1 wherein the connector member has a T shaped end with the slot medially located, the T-shaped end include peripheral longitudinal beading that contacts the body.

8. The connector system according to claim 1 wherein the connector member has arms projecting from the narrow intermediate section, there being a juncture between the arms and the intermediate section, there being a small slot at the juncture of the arms being adapted to close or partially close as the arms are biassed.

9. The connector system according to claim 1 wherein the connector member has arms projecting from the narrow intermediate section, each arm having a bead extending along an edge of the arm, the bead providing a focal line for the bias.

10. The connector system according to claim 1 wherein the expander is reversible to release the connector.

11. The connector system according to claim 1 wherein the expander has tapered enlargements, the tapered enlargement being tapered at opposite ends, so that the expander is reversible-he and the enlargement may be fluted to reduce friction.

12. The connector system according to claim 1 wherein the expander has tapered enlargements, the tapered fluted enlargement being tapered at opposite ends, so that the expander is reversible.

13. A modular window system comprising window modules and a window module connector system, each window module having slotted outer frame members, the connector system comprising an elongate connector member and a connector member expander, the connector member being adapted to retentively engage the slots in the slotted members upon application of the expander to the connector member, wherein the connector member expander has an expander section serarated by narrow non- expander sections and in use be located wholly within the connector member until driven into expanding position by an expander displacer.

14. The modular window system according to claim 13 wherein the elongate connector member is generally I-shared in profile having a central web connecting opposed pairs of bilaterally projecting arms, at least one set of arms having the slots so that upon axial movement of the expander in the slots, the set of arms are biassed toward the other set of arms.

15. An improved window frame assembly comprising a sash, a sill and a seal disposed between the sash and sill, the seal having a section adjacent a lower edge of the window assembly, the sill and sash having complimentary lower marginal sections outboard of said seal and extending along at least the lower edge of the window assembly, the lower marginal sections defining there between an inclined water flow passage means, the water flow passage means being downwardly inclined from a position adjacent said seal to the edge of the window assembly, and further comprising a connector member and a connector member expander, the connector member in profile having enlarged ends and a narrower intermediate section between the ends, one end having a slot to receive the connector member expander to expand the slot so the enlarged end is biassed to retentively engage a body located adjacent the intermediate section, wherein the connector member expander has an expander section separated by narrow non-expander sections and in use be located wholly within the connector member until driven into expanding position by an expander displacer.

* * * * *